(12) United States Patent
Bright et al.

(10) Patent No.: US 7,813,060 B1
(45) Date of Patent: Oct. 12, 2010

(54) COMBINATION POCKET MIRROR AND MAGNIFIER

(76) Inventors: Patricia P. Bright, 11019 Jordan Rd., Carmel, IN (US) 46032; Jonathan P. Bright, 11019 Jordan Rd., Carmel, IN (US) 46032

( * ) Notice: Subject to any disclaimer, the term of this patent is extended or adjusted under 35 U.S.C. 154(b) by 585 days.

(21) Appl. No.: 11/728,669

(22) Filed: Mar. 27, 2007

Related U.S. Application Data

(60) Provisional application No. 60/785,955, filed on Mar. 27, 2006.

(51) Int. Cl.
*G02B 27/02* (2006.01)
(52) U.S. Cl. .................. 359/802; 359/803; 359/804
(58) Field of Classification Search ......... 359/802–804, 359/808–811
See application file for complete search history.

(56) References Cited

U.S. PATENT DOCUMENTS

| | | | |
|---|---|---|---|
| D264,009 S | 4/1982 | Lam | |
| 4,524,647 A | 6/1985 | Holoff et al. | |
| 5,471,347 A | 11/1995 | Galiani | |
| 5,610,770 A | 3/1997 | Galiani | |
| 6,095,334 A | 8/2000 | Belveal et al. | |
| 6,502,587 B1 | 1/2003 | Kellum et al. | |
| D478,688 S | 8/2003 | Thorpe et al. | |
| D488,263 S | 4/2004 | Thorpe et al. | |

*Primary Examiner*—Ricky L Mack
*Assistant Examiner*—Brandi N Thomas
(74) *Attorney, Agent, or Firm*—Montgomery Patent and Design, LLC; Robert C. Montgomery

(57) ABSTRACT

A combination illuminated magnifier and mirror device comprises a compact and low-profile case of a resilient material, a separate magnifying assembly, a separate mirror assembly, a release mechanism for releasing both assemblies, and an illuminating device for viewing ease. Both magnifying and mirror assemblies are separately functional from each other; however the combination thereof provides the greatest benefit to the user. Accessories for the present invention are anticipated and may include a tool slot for tweezers and an exterior flashlight.

14 Claims, 3 Drawing Sheets

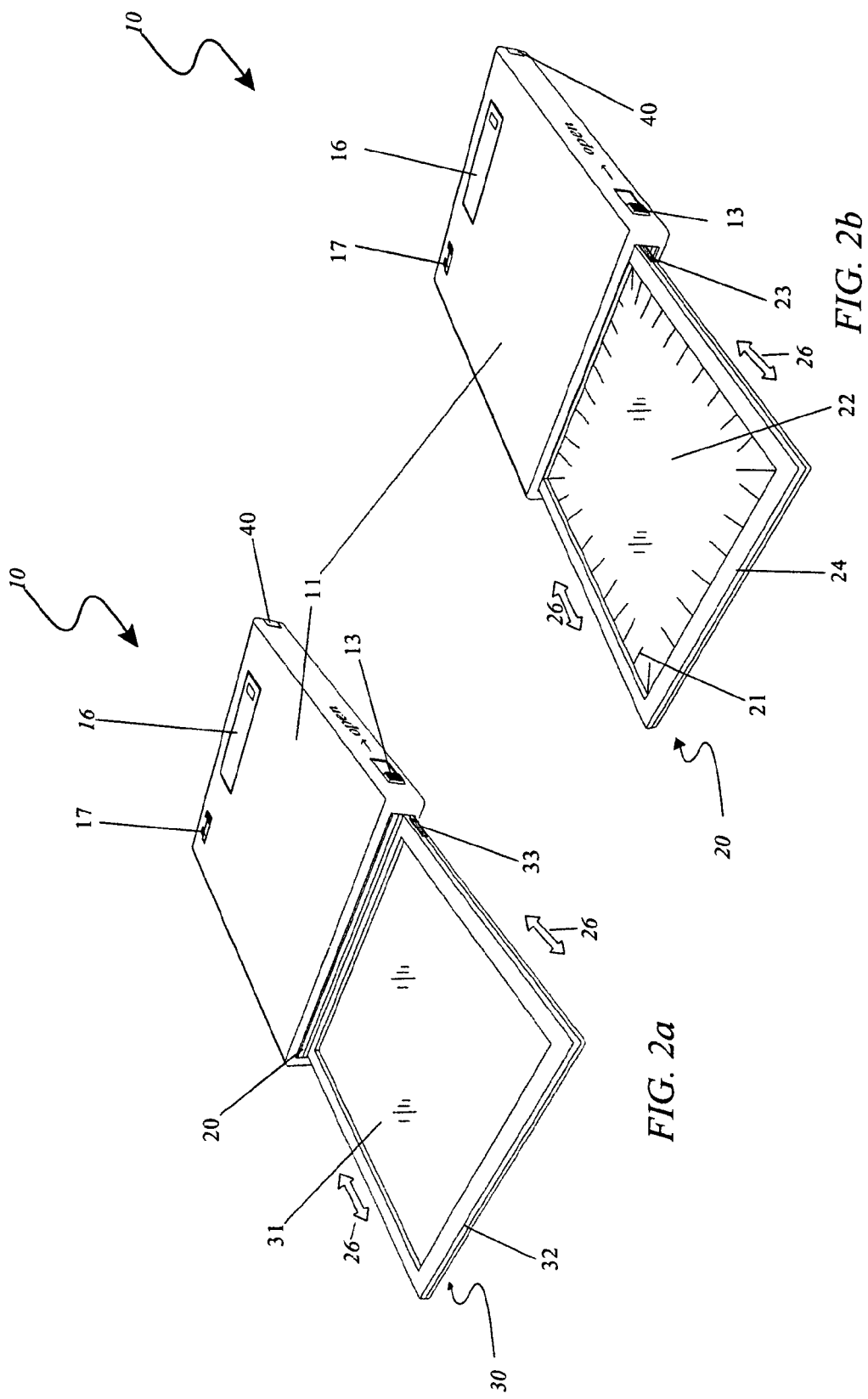

COMBINATION POCKET MIRROR AND MAGNIFIER

RELATED APPLICATIONS

The present invention was first described in U.S. Patent Provisional No. 60/785,955 filed on Mar. 27, 2006 the entire disclosures of which are incorporated herein by reference.

FIELD OF THE INVENTION

The present invention relates generally to a combination illuminated magnifier and mirror device and, more particularly, to a device comprising a compact and low-profile case of a resilient material, a separate magnifying assembly, a separate mirror assembly, a release mechanism for releasing both assemblies, a flashlight and an illuminating device for viewing ease.

BACKGROUND OF THE INVENTION

Many people turn to hand-held magnifying lenses to see small objects. Whether the object is part of a hobby, small print on a contract, or a small component on a circuit board or engine, nothing beats a magnifying lens for making the object appear larger than life while keeping every detail sharp and crisp. However, due the optical properties of a magnifying lens, additional light on the magnifying object is required to make the magnifying process work efficiently. This typically requires the use of a separate light source from a lamp or flashlight, which of course requires another hand to hold the light source, but still keep it out of the way of the actual viewing process. The same problem of inadequate light is also encountered when using a mirror to see objects such as one's own face or a small component on a machine which may be hidden from a direct line of site.

Addressing the need defined herein, the innovative device combines the functions of a pocket mirror, a pocket magnifying glass and a pocket light. Upon initial observation, the invention looks like a conventional pocket magnifying glass contained within a plastic enclosure. However, after closer inspection, it can be seen that in addition to the magnifying lens, a mirror slides out of the other end of the enclosure, opposite of the magnifying lens. Additionally, a small light source, envisioned to be a light emitting diode (LED), is provided to light up both the mirror and magnifying lens area. A slide switch is mounted on the side of the enclosure to control the light source. The invention is powered by a set of small, user replaceable batteries. The use of the disclosed device provides the functionality of a lighted mirror and a lighted magnifying lens in compact case which is not only easy and effective to use but always handy as well.

Several attempts have been made in the past to provide a compact magnifying lens and mirror assembly in a single apparatus. U.S. Pat. No. 6,095,334, in the name of Belveal et al., discloses a dual-faced mirror compact case with a mirror attached to an expandable and retractable yoke with a pivoting mechanism to allow the user to choose between an normal reflective surface and a magnified reflective surface.

U.S. Pat. No. 6,502,587, in the name of Kellum et al., teaches a kit with illuminated tweezers and magnifying mirror, utilized for the removal of unwanted facial hair, comprising a housing with a battery and adapted to accommodate a folding, hinged mirror.

U.S. Pat. No. 4,524,647, in the name of Holoff et al., describes a tweezer assembly for handling small objects comprising a housing, a magnifying lens, a light source, and tweezers, wherein the tweezers are pivotally mounted on a the housing.

None of the prior art particularly describes a compact, portable device combining the attributes of an illuminated magnifying apparatus, a mirror, a flashlight, and a set of tweezers. Accordingly, there exists a need for a means by which additional light can be easily added to objects being viewed in a mirror or through a magnifying lens, without the disadvantages as described above.

SUMMARY OF THE INVENTION

In view of the foregoing disadvantages inherent in the prior art, it has been observed that there is need for an apparatus that combines a compact mirror assembly with an associated magnifying lens assembly in a battery-powered enclosure with a flashlight and tool slot for retaining a small tool.

The apparatus comprises a rectangular enclosure with a slim profile design and shaped slightly larger than a business card, said enclosure has a pair of release buttons that releasably engage a magnifying lens assembly and a mirror assembly between a retracted state and a fully extended state.

The apparatus also includes said magnifying lens assembly further comprising a magnifying lens of a certain magnifying power encased within a magnifying lens bezel, said bezel slidably enaged within a first track. The magnifying lens assembly is able to slide between a first retractable position and a first fully extended state and retained at said first fully extended state with a pair of first locking mechanisms.

The apparatus also includes said an illumination ring embedded within said magnifying lens bezel that is activated either during release of the magnifying lens assembly via the release buttons or user-selectable.

The apparatus also includes means to detachably remove said magnifying lens assembly therefrom said magnifying lens bezel and replace with an alternate magnifying lens of a different power.

The apparatus also includes said mirror assembly further comprising a mirror encased within a mirror bezel, said bezel slidably enaged within a second track. The mirror assembly is able to slide between a second retractable position and a second fully extended state and retained at said second fully extended state with a pair of second locking mechanisms.

The apparatus also comprises a small tool retained with a tool slot with a knurled surface to facilitate removal of said tool. Said tool slot is located in a corner of said enclosure out of the way of the operation of both said magnifying lens and mirror assemblies.

The apparatus also comprises a flashlight located in a recessed location within a rear panel of said enclosure to provide an illuminating means via a flashlight switch located adjacent to said flashlight on an upper panel of said enclosure, said flashlight switch comprising a sliding flush-mount, single contact closure type switch.

Another object of the present invention comprises a support or holding stand to position said apparatus in a flat or angled orientation upon a flat surface, provided either as a separate accessory or integrated as a fold-out feature being attached to said enclosure.

Another object of the present invention comprises a wall mounting mechanism providing particular molded-in wall mounting features.

Another object of the present invention comprises a hinged attachment system for said mirror assembly and magnifying lens assembly thereto said enclosure, thereby enabling an angular or a flat viewing orientation of an object or subject.

Another object of the present invention comprises a built-in compartment for cosmetic powders and the like slidably engaged therein a third track located within said enclosure or located therein a pop-out flush-mounted panel along a top surface of said enclosure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
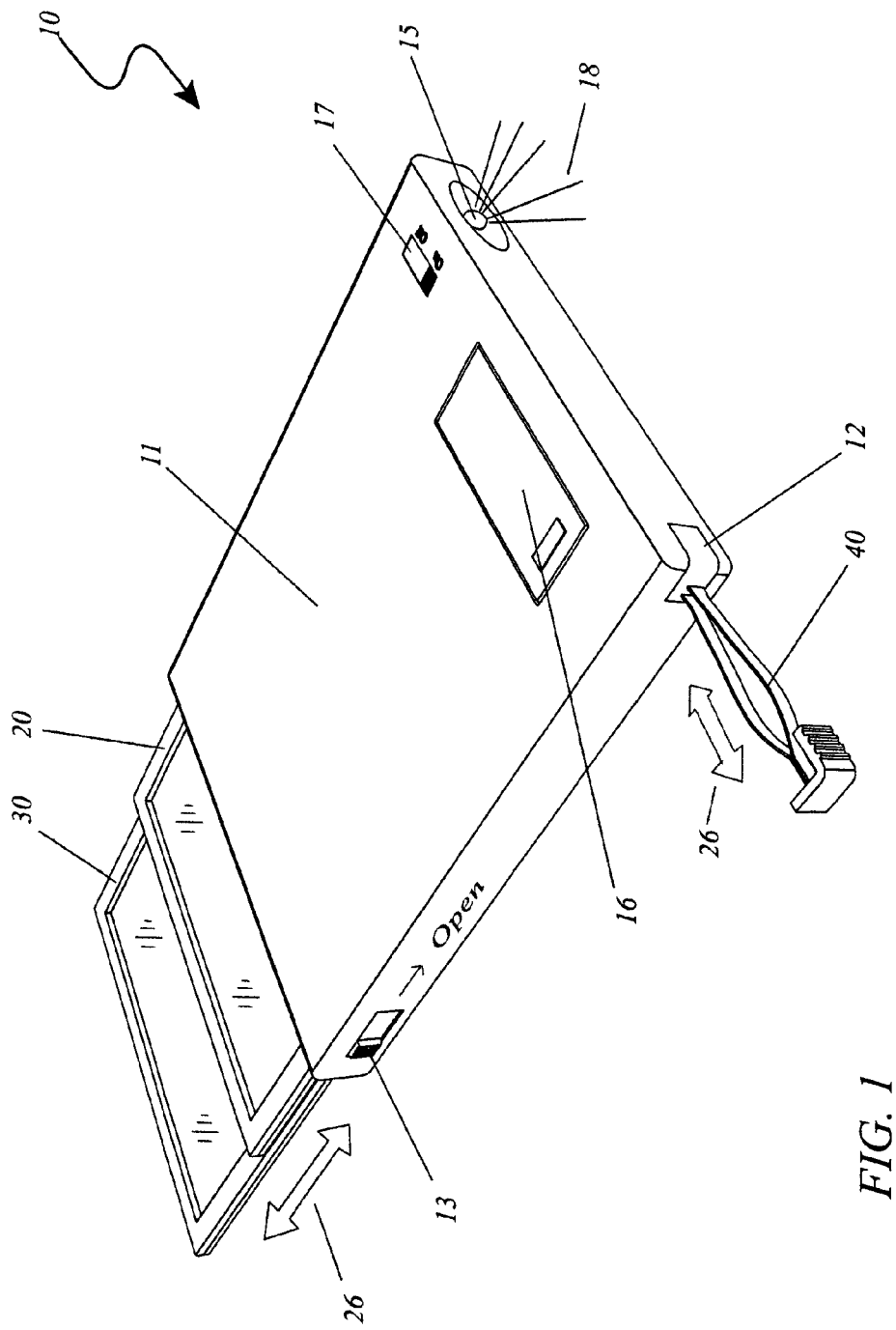
FIG. 1 is a side perspective view of a combination illuminated mirror and magnifier 10, according to a preferred embodiment of the present invention; and, FIG. 2a is a front perspective view of a combination illuminated mirror and magnifier 10 with a deployed mirror assembly portion 30, according to a preferred embodiment of the present invention; and, FIG. 2b is a front perspective view of a combination illuminated mirror and magnifier 10 with a deployed first magnification lens assembly portion 20, according to a preferred embodiment of the present invention; and, FIG. 3a is a front perspective view of a combination illuminated mirror and magnifier 10 with deployed mirror and first magnification lens assembly portions 20, 30, according to a preferred embodiment of the present invention; and, FIG. 3b is a front perspective view of a combination illuminated mirror and magnifier 10 with a detached first magnification lens assembly portion 20, according to a preferred embodiment of the present invention.

DESCRIPTIVE KEY 10 combination illuminated mirror and magnifier
11 enclosure
12 tool slot
13 release button
15 flashlight
16 battery compartment
17 flashlight switch
18 illumination
20 first magnifying lens assembly
21 illumination device
22 magnifying lens
23 locking mechanism
24 magnifying glass bezel
25 second magnifying lens assembly
26 sliding movement
30 mirror assembly
31 mirror
32 mirror bezel
33 locking mechanism
40 tool

DETAILED DESCRIPTION OF THE PREFERRED EMBODIMENT

The best mode for carrying out the invention is presented in terms of its preferred embodiment, herein depicted within FIGS. 1 through 3b However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a combination illuminated mirror and magnifier (herein described as the "apparatus") 10, which provides a means for a plastic enclosure 11 containing an illuminated compact magnifying lens 22 and a mirror 31. Both magnifying lens and mirror assemblies 20, 30 are separately functional from each other; however, the combination thereof provides the greatest benefit to the user. Accessories for the present invention 10 are a tool slot 12 providing included tweezers 40, a flashlight 15, and interchangeable magnifying lens assembly portions 20, 25 comprising of various powers of magnification.

Referring now to FIG. 1, a side perspective view of the apparatus 10, according to the preferred embodiment of the present invention, is disclosed. The apparatus 10 is shown here comprising a rectangular-shaped enclosure 11 sized slightly larger than a business card. The enclosure 11 comprises a plastic injection molded housing defining a hollow cavity. The apparatus 10 further comprises a first magnifying lens assembly 20 and a mirror assembly 30 being releasably slidingly installed therein the enclosure 11 upon separate tracks (see FIGS. 2a and 2b). The apparatus 10 further comprises a pair of spring-loaded release buttons 13, a molded-in tool slot 12, a flashlight 15, a battery compartment 16, and a flashlight switch 17. The enclosure 11 is also envisioned to contain internal spring-loaded operating mechanisms (not shown) which provide an extending means to said assemblies 20, 30 when being deployed.

The pair of spring-loaded release buttons 13 are located on opposite sides of the enclosure 11 along exterior side panels, providing a releasing and stopping means for a mirror assembly 30 and a first magnifying glass assembly 20 (see FIGS. 2a and 2b). The tool slot 12 is located along a side panel of said enclosure 11 at a rear position and provides a concealing means for a small tool such as tweezers 40 commonly associated with the use of a pocket mirror. The tool slot 12 snugly houses said tool 40 in a recessed and molded-in manner that does not interfere with the sliding movements 26 of the sliding assemblies 20, 30.

The flashlight 15 is located in a recessed manner along the rear panel of the enclosure 11 and is envisioned to use illuminating devices such as an LED or incandescent bulb to provide an illuminating means 18. The flashlight 15 is powered by the internal battery therein the battery compartment 16. The battery compartment 16 comprises a latching door having storage capacity for one (1) or more miniature batteries. The battery compartment 16 is envisioned to be made using similar materials as the enclosure 11. A flashlight switch 17 is located along a top surface of the enclosure 11 adjacent to the flashlight 15. The flashlight switch 17 comprises a sliding flush-mount, single contact closure type switch being common in the industry, thereby controlling DC current to the flashlight 15.

Referring now to FIG. 2a, a front perspective view of the apparatus 10 with a deployed mirror assembly portion 30, according to the preferred embodiment of the present invention, is disclosed. The apparatus 10 comprises a mirror assembly 30, a pair of spring-loaded release buttons 13, and an enclosure 11. The mirror assembly 30 is located on a track immediately below the first magnifying lens assembly 20 and further comprises a mirror 31, a mirror bezel 32, and a pair of locking mechanisms 33. The mirror assembly 30 slides outward on a track in a sliding movement 26 when the release buttons 13 are pressed backward, and extend outward until engagement of the locking mechanisms 33. The locking mechanisms 33 comprise a protruding molded-in feature being located along opposite side portions of the mirror bezel 32. The locking mechanisms 33 provide a locking means to hold the mirror assembly 30 in an extended position. The mirror bezel 32 encircles the mirror 31 and is envisioned being made using a similar material as the enclosure 11. The mirror 31 comprises a common glass mirror surface to effect reflection of any light or image that is projected thereupon.

Referring now to FIG. 2b, a front perspective view of the apparatus 10 with a deployed magnification lens assembly portion 20, according to the preferred embodiment of the present invention, is disclosed. The apparatus 10 comprises a first magnification lens assembly 20, a pair of spring-loaded release buttons 13, and an enclosure 11. The first magnification lens assembly 20 is located on a track immediately above the mirror assembly 30 and further comprises an illumination device 21, a magnifying lens 22, a pair of locking mechanisms 23, and a magnifying glass bezel 24. The first magnification lens assembly 20 slides outward on a track in a sliding movement 26 when the release buttons 13 are pressed backward, and extend outward until engagement of the locking mechanisms 23. The locking mechanisms 23 comprise a protruding molded-in feature being located along opposite side portions of the magnifying glass bezel 24. The locking mechanisms 23 provide a locking means to hold the first magnifying lens assembly 20 in an extended position. The locking mechanisms 23 also provide a means to remove the first magnifying lens assembly 20 from the enclosure 11 (see FIG. 3b). The magnifying lens 22 is envisioned to be a common glass or plastic optical element and may provide various common levels of magnification such as 3.5× and 7×. The magnifying glass bezel 24 encircles a magnifying lens 22 and is envisioned to be made using similar materials as the enclosure 11. The illumination device 21 comprises a circumferential illuminating ring of soft luminescent light being projected across the viewing area. The illumination device 21 is envisioned using technologies such as miniature LED lamps, a diffusion ring, fiber optics, incandescent lamps, or the like and as such should not be interpreted as a limiting factor of the present invention 10. The illumination device 21 is also envisioned to be activated when the release buttons 13 are pressed backward. It is envisioned that various electronic components, light generating components, and wiring necessary for operation of said illumination device 21 may reside within the enclosure 11.

Figures 3A, 3B:
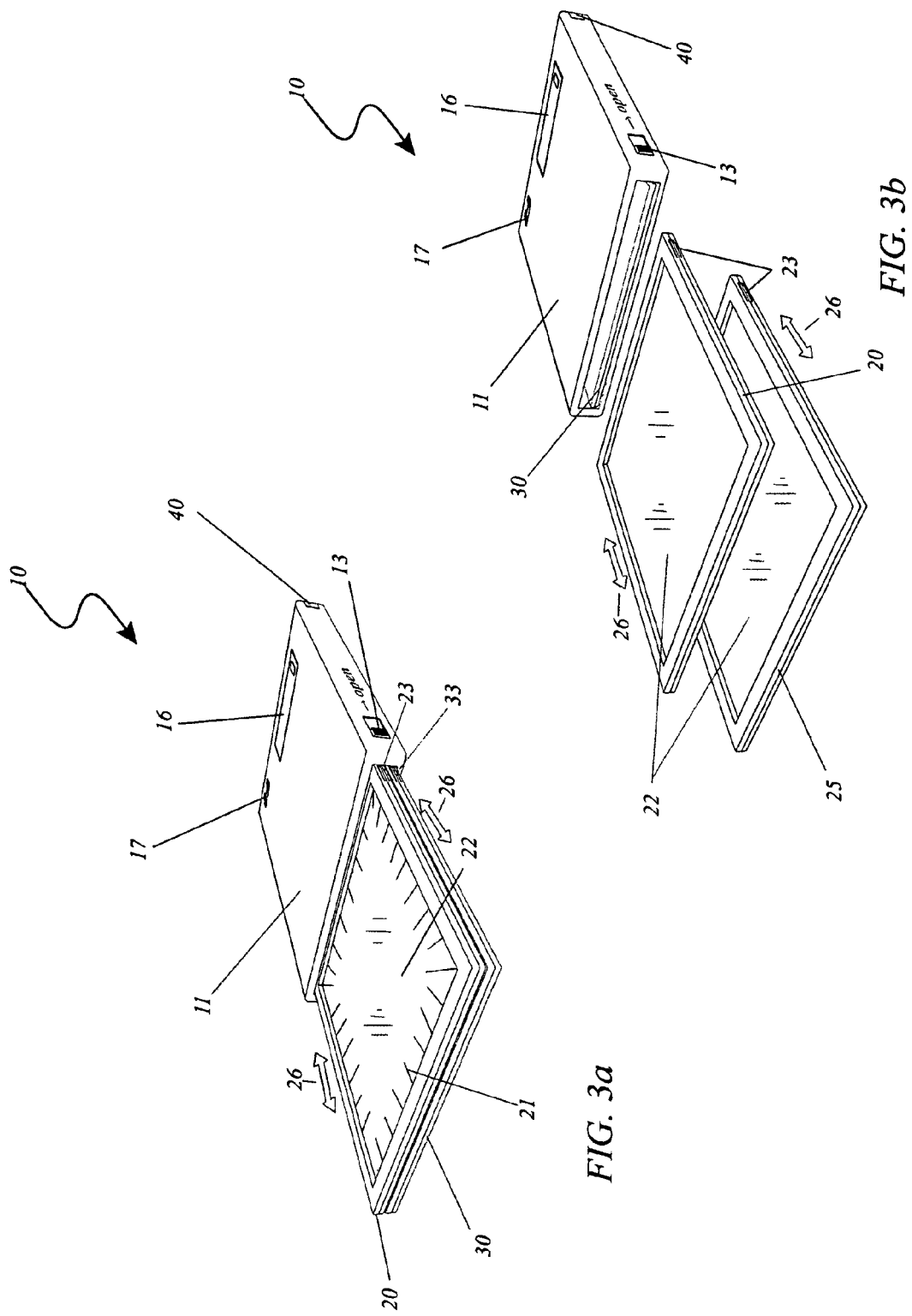

Referring now to FIG. 3a, a front perspective view of the apparatus 10 with deployed mirror and first magnification lens assembly portions 20, 30, according to the preferred embodiment of the present invention, is disclosed. The apparatus 10 is illustrated here with the first magnifying lens assembly 20 and mirror assembly 30 being in the extended position and used in combination. When in this configuration, said assemblies 20, 30 provide a magnified, and illuminated view of a reflected subject, thereby taking full advantage of the capabilities of the present invention 10. It is envisioned that the clearance between the first magnifying lens assembly 20 and the mirror assembly 30 be minimal so as to enhance the capabilities of operating both assemblies 20, 30 coincidentally and also to minimize the size profile of the entire apparatus 10.

Referring now to FIG. 3b, a front perspective view of a combination illuminated mirror and magnifier 10 with a detached magnification lens assembly portion 20, according to the preferred embodiment of the present invention, is disclosed. The apparatus 10 comprises an enclosure 11, a first magnifying glass assembly 20, a second magnifying lens assembly 25, a magnifying lens 22, and a pair of locking mechanisms 23. The locking mechanisms 23 further provide a release means to the first magnification glass assembly 20, thereby separating said first magnifying lens assembly 20 from the enclosure 11 by manually pressing thereon said locking mechanisms 23. Detachment of the first magnification glass assembly 20 enables the installing of an alternate second magnifying lens assembly 25 containing an alternate power magnifying lens 22. The second magnifying lens assembly 25 comprises similar materials and construction as the first magnifying lens assembly 20.

It is envisioned that the enclosure 11, the sliding assemblies 20, 25, 30 and other external portions of the apparatus 10 be manufactured using attractive durable plastic materials such as polypropylene, polycarbonate, polyvinylchloride (PVC), or the like and are further envisioned to be provided in a variety of decorative colors and patterns.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIG. 1.

The method of utilizing the apparatus 10 may be achieved by performing the following steps: loading fresh batteries into the battery compartment 16; using the flashlight 15 as needed; grasping the apparatus 10 by opposing side panels of the enclosure 11 and sliding the two (2) release buttons 13 backward to cause the illumination device 21 to be activated and the magnifying glass and the mirror assemblies 20, 30 to be projected outward in a sliding movement 26 to a locked position; choosing which assembly 20, 30 to use and simply pushing the other one back into the enclosure 11 or use both in concert, thereby taking full advantage of the present invention 10 by the simultaneous utilization of both assemblies 20, 30 to produce a low-distortion, softly illuminated, magnified, and reflected image; pressing the two (2) locking mechanisms 23, thereby releasing the first magnifying lens assembly 20 from the enclosure 11; installing a second magnifying lens assembly 25 comprising a different magnification, thereby improving the viewing task; using the apparatus 10 to perform a variety of tasks such as, but not limited to, magnifying and reading fine print on documents, viewing maps, viewing menus in poor lighting situations, checking the application of cosmetics, or after close examination of facial skin, removing the included tweezers 40 from the tool slot 12 and extracting small hairs; sliding and securing the first magnifying lens and the mirror assemblies 20, 30 into the enclosure 11 after completion of a desired task; and, enjoying the multiple functions and compact convenience of the present invention 10.

An alternate embodiment of the present invention 10 comprises a first magnifying lens assembly 20 being provided with interchangeable magnifying lens inserts 22 to reduce purchase cost. Magnifying lenses 22 of various powers would be snapped into place within the magnifying glass bezel 24.

Another alternative embodiment of the present invention 10 comprises the illumination device 21 being selectively utilized with the magnifying lens assembly 20, the mirror assembly 30, both, or neither.

Yet another alternative embodiment of the present invention 10 comprises a support or holding stand to position the apparatus 10 in a flat or angled orientation upon a flat surface. Said support may be provided either as a separate accessory or integrated as a fold-out feature being attached to the enclosure portion 11 of the apparatus 10.

Yet another alternative embodiment of the present invention 10 comprises a wall mounting mechanism providing particular molded-in wall mounting features.

Yet another alternative embodiment of the present invention 10 comprises a design utilizing a hinged attachment system for the mirror assembly 30 and first magnifying lens assembly 20 to the enclosure portion 11, thereby enabling angular or flat viewing of an object or subject.

Yet another alternative embodiment of the present invention 10 comprises a built-in compartment for cosmetic powders and the like. Said compartment may comprise a third sliding assembly or a pop-out flush-mounted panel along a top surface of the enclosure 11.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A combination illuminated mirror and magnifying apparatus, comprising an enclosure further comprising:
    a magnifying lens assembly located on a first track and releasably slidably engaged therein, further comprising:
        a magnifying lens bezel slidably engaged therein said first track, comprising a pair of first locking mechanisms for receiving a pair of release buttons when in a first fully extended state, wherein said magnifying lens bezel is retained in a first retracted state by said pair of release buttons and slidably extends outward from said enclosure when said pair of release buttons are slid backwards; and,
        a magnifying lens retained by said magnifying lens bezel comprising a range of levels of magnification, wherein said magnifying lens comprise a common glass or plastic optical element;
    a mirror assembly releasably slidably engaged therein;
    said pair of release buttons operably releasing both said magnifying lens assembly and said mirror assembly;
    a tool slot located on an outer surface of said enclosure for retaining a tool therein, said tool comprising a knurled surface to facilitate removal of said tool;
    a battery compartment comprising a latching door located on an outer surface of said enclosure for retaining a battery power source; and,
    a flashlight assembly located on an outer surface of said enclosure in electrical communication with said battery power source.

2. The apparatus of claim 1, further comprising an illumination device nestled within said magnifying lens bezel in electrical communication with said battery power source, comprising a circumferential illuminating ring of soft luminescent light being projected across a viewing area and is activated when said release buttons are slid backward.

3. The apparatus of claim 1, wherein said mirror assembly a second track below said first track and further comprises:
    a mirror bezel slidably engaged therein said second track, comprising a pair of second locking mechanisms for receiving said release buttons when in a second fully extended state;
    wherein said mirror bezel is retained in a second retracted state by said release buttons and slidably extends outward from said enclosure when said release buttons are slid backward;
    a mirror retained by said mirror bezel comprising a common glass mirror surface to effect reflection of any light or image that is projected thereupon.

4. The apparatus of claim 3, wherein said tool slot is located along a side panel of said enclosure at a rear position and provides a concealing means for a small tool in a recessed orientation that does not interfere with operation of said magnifying lens assembly or mirror assembly.

5. The apparatus of claim 4, wherein said small tool is a pair of tweezers.

6. The apparatus of claim 4, wherein said flashlight is located in a recessed location within a rear panel of said enclosure to provide an illuminating means via a flashlight switch located adjacent to said flashlight on an upper panel of said enclosure, said flashlight switch comprising a sliding flush-mount, single contact closure type switch, and an ON and OFF position.

7. The apparatus of claim 6, wherein said magnifying lens is detachably retained therein said first track of said enclosure such that an alternate magnifying lens of differing magnification can be inserted therein said first track of said enclosure.

8. The apparatus of claim 7, wherein said magnifying lens and alternate magnifying lens each comprise a range of magnifying power of 3.5× to 7×.

9. The apparatus of claim 6, wherein said apparatus comprises a rectangular-shaped enclosure sized slightly larger than a business card and wherein said enclosure, magnifying lens bezel, mirror bezel, and tool comprise a durable plastic material of construction in a variety of decorative colors and patterns.

10. The apparatus of claim 6, wherein said illumination device is selectively utilized either independently or concurrently therewith said magnifying lens assembly and mirror assembly.

11. The apparatus of claim 6, further comprising a support or holding stand to position said apparatus in a flat or angled orientation upon a flat surface, provided either as a separate accessory or integrated as a fold-out feature being attached to said enclosure.

12. The apparatus of claim 6, further comprising a wall mounting mechanism providing particular molded-in wall mounting features.

13. The apparatus of claim 6, further comprising a hinged attachment system for said mirror assembly and magnifying lens assembly thereto said enclosure, thereby enabling an angular or a flat viewing orientation of an object or subject.

14. The apparatus of claim 6, further comprising a built-in compartment for cosmetic powders and the like slidably engaged therein a third track located within said enclosure or located therein a pop-out flush-mounted panel along a top surface of said enclosure.

* * * * *